United States Patent [19]
Coyle, Jr. et al.

[11] Patent Number: 5,268,556
[45] Date of Patent: Dec. 7, 1993

[54] LASER WELDING METHODS

[75] Inventors: Richard J. Coyle, Jr., Lawrenceville, N.J.; Kevin M. Hogan, Sinking Spring, Pa.; Paul J. Sakach, Vincentown; Patrick P. Solan, Robbinsville, both of N.J.

[73] Assignee: AT&T Bell Laboratories, Murray Hill, N.J.

[21] Appl. No.: 977,950

[22] Filed: Nov. 18, 1992

[51] Int. Cl.$^5$ .............................................. B23K 26/00
[52] U.S. Cl. .......................... 219/121.76; 219/121.61
[58] Field of Search ................. 219/121.63, 121.64, 219/121.61, 121.77

[56] References Cited

U.S. PATENT DOCUMENTS

| | | | |
|---|---|---|---|
| 4,214,904 | 7/1980 | Kitchen et al. | 75/165 |
| 4,355,084 | 10/1982 | Kitchen | 428/672 |
| 4,506,108 | 3/1985 | Kersch et al. | 174/52 |
| 4,859,827 | 8/1989 | Coyle, Jr. et al. | 219/121.64 |
| 5,183,992 | 2/1993 | Bilge et al. | 219/121.64 |
| 5,187,346 | 2/1993 | Bilge et al. | 219/121.64 |

*Primary Examiner*—C. L. Albritton
*Attorney, Agent, or Firm*—Roderick B. Anderson

[57] ABSTRACT

Welding a first body (11) of a first metal which has been plated on one surface thereof with a layer (13) of a second metal comprises the step of vaporizing a portion of said layer. This is done by directing a first pulsed laser beam (17) at the layer (13), the first pulsed laser beam having a first relatively high peak power and a first relatively low pulse duration. The vaporizing results in exposure of a portion of the first body (11). Thereafter, part of the first body is melted by directing a second pulsed laser beam (20) at the exposed portion of the first body, said second pulsed laser beam having a second peak power smaller than the first peak power and a second pulse duration longer than said first pulse duration. By using the same laser (18) in a two-step process, first to vaporize a portion of the plating, such as gold plating on Kovar, and thereafter using the same laser for making the weld, one can avoid a microcracking problem in a manner that is quick, simple and convenient.

11 Claims, 1 Drawing Sheet

LASER WELDING METHODS

This invention relates to laser welding methods and, more particularly, to methods for welding a body of one metal such as Kovar having thereon a plating of another metal such as gold.

BACKGROUND OF THE INVENTION

The copending U.S. patent of Coyle et al., U.S. Pat. No. 4,859,827, granted Aug. 22, 1989, is an example of the literature describing laser welding of various metal workpieces. The Coyle et al. patent describes a method for laser welding a sleeve to an optical fiber ferrule. The optical fiber can be rotationally aligned within the sleeve, and, after alignment has been obtained, laser welding can conveniently be used to bond the sleeve to the ferrule so as to insure permanent rotational alignment of the fiber with respect to the sleeve.

Especially when optical fibers are to be used in remote environments such as undersea cables, they must be made with processes that insure long-term reliability. The optical fiber ferrules and sleeves, as described in the Coyle patent, are typically made of a material such as Kovar (a trademark for an iron-nickel-cobalt alloy) to minimize the effects of differential thermal expansion. The Kovar in turn is typically plated with a thin protective layer of gold.

We have found that laser welds of gold-plated Kovar are susceptible to microcracking, which can seriously impair their reliability. Our study of the problem has shown that this microcracking is caused by an excess of gold in the Kovar weld. Thus, one way of avoiding the problem would be to etch away a portion of the gold plating prior to making the weld. This of course would significantly increase the cost and complexity of Kovar welds and would complicate the mass-production of components containing aligned optical fibers. Accordingly, there is a need for a method for making reliable welds in gold-plated Kovar which is simple, inexpensive, and which requires little operator skill.

SUMMARY OF THE INVENTION

In accordance with one embodiment of the invention, welding in a first body of a first metal which has been plated on one surface thereof with a layer of a second metal comprises the step of vaporizing a portion of said layer. This is done by directing a first pulsed laser beam at the layer, the first pulsed laser beam having a first relatively high peak power and a first relatively low pulse duration. The vaporizing results in exposure of a portion of the first body. Thereafter, part of the first body is melted by directing a second pulsed laser beam at the exposed portion of the first body, said second pulsed laser beam having a second peak power smaller than the first peak power and a second pulse duration longer than said first pulse duration. By using the same laser in a two-step process, first to vaporize a portion of the plating, such as gold plating on Kovar, and thereafter using the same laser for making the weld, one can avoid the microcracking problem in a manner that is quick, simple and convenient.

In another embodiment, the first pulsed laser beam scans an area of the coating to vaporize it. This embodiment can be used to make a better defined opening in a thicker plating of gold, but has the disadvantage of typically requiring a different laser for the vaporizing step than is used for the welding step.

These and other objects, features and benefits of the invention will be better understood from a consideration of the following detailed description taken in conjunction with the accompanying drawing.

DETAILED DESCRIPTION

Figure 1:
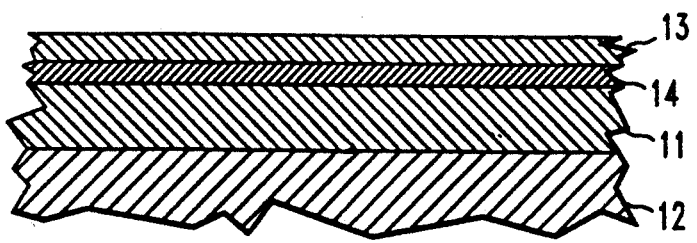
FIGS. 1–3 illustrate successive steps of a laser welding method in accordance with one embodiment of the invention.

Referring now to FIG. 1, there is shown a first metal body 11 in contact with a second metal body 12. The first metal body 11 may be Kovar which is plated with a gold layer 13. An intermediate nickel layer 14 aids in the adherence of the gold to the first metal body 11. The first metal body 11 may be a metal sleeve, and the second metal body 12 may be a ferrule for holding an optical fiber as described in the aforementioned Coyle et al. patent. The purpose of the gold plating is to protect the metal 11 from oxidation and other forms of environmental contamination. The problem to which the invention is directed is the relative unreliability of welds made by laser welding through the first metal body 11 so as to permanently bond bodies 11 and 12. Even though the gold layer 13 may only be between two and nine microns thick, our studies have indicated that the resulting weld can be subject to microcracking, and these microcracks are caused by an excess of gold in the weld that has been produced.

Figure 2:
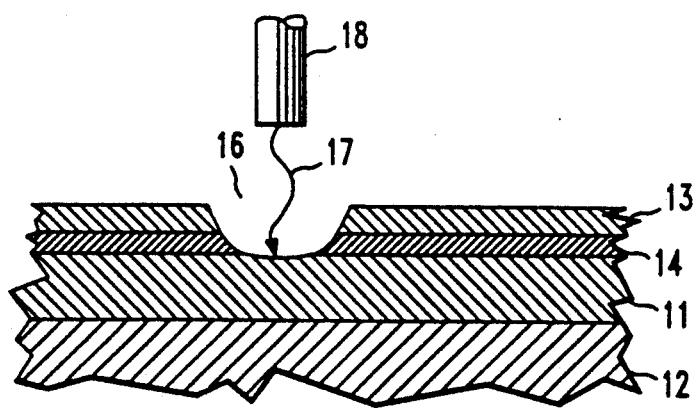

Referring to FIG. 2, in accordance with one embodiment of the invention, prior to the laser weld, a portion of the gold layer 13 is ablated to form a cavity 16 which exposes a surface of the first metal body 11. Laser ablation results from extremely rapid vaporization of a portion of the gold 13 and is characterized by a minor explosion which physically propels particles of the gold layer 13 to form the cavity 16. This rapid vaporization is caused by a first pulsed laser beam 17 from a laser 18 having a relatively high peak power and a relatively short pulse duration. If the laser beam 17 is of a much lower peak power or of a relatively longer duration, it tends simply to melt together the gold, the nickel and the Kovar of layers 13, 14 and body 11.

Figure 3:
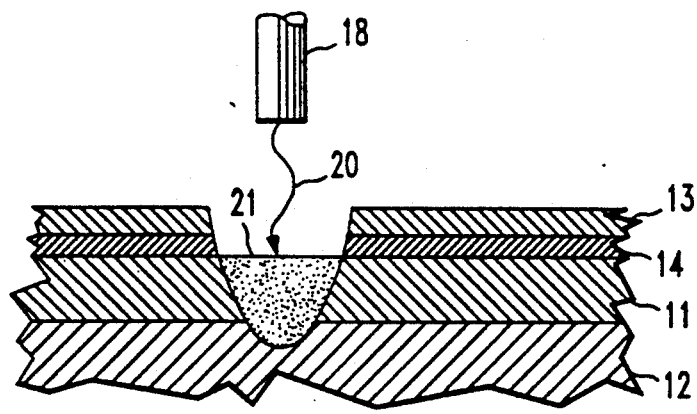

Referring to FIG. 3, after vaporization of the gold layer 13, the exposed first body 11 is melted by a laser beam 20 to form a melt 21 that extends into the second body 12. The first and second bodies 11 and 12 may both be of Kovar, in which case the melt 21 is predominantly Kovar and contains very little gold due to the prior cavitation of the gold layer. Thus, after the melt 21 hardens, it forms a reliable weld that bonds together the metal bodies 11 and 12, as is required for optical fiber alignment, for example. Our studies have shown that such welds are not subject to the microcracking described above.

An advantage of the embodiment of FIGS. 2 and 3 is that it can be performed with a single laser 18 which may typically be a neodymium:yttrium-aluminum-garnet (Nd:YAG) pulsed laser. The ablation shown in FIG. 2 may be performed by a single pulse of the laser having an energy of 0.8 joules, a pulse width of 0.1 millisecond, an optical spot size of four hundred microns, and a nominal pulse repetition rate of five hertz. This yields a peak power of eight kilowatts. The laser beam 20 of FIG. 3 may have an energy of 3.0 joules, a pulse width of 5.0 milliseconds, a pulse repetition rate of five hertz, and an optical spot size of four hundred microns, which yields a peak power of six hundred watts. As can be seen, the peak power of beam 17 is much higher than that of beam 20, and the pulse duration of beam 17 is much shorter than that of laser beam 20. If it is desired to have a larger area of the metal body 11 exposed by cavity 16 of FIG. 2, the body 11 can be moved relative to laser 18, and other overlapping cavities such as cavity 16 can be formed to give a larger area of exposure.

Figure 4:
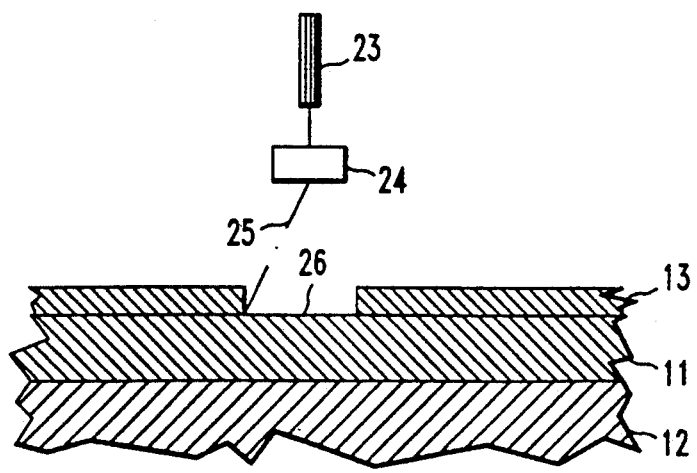
FIG. 4 illustrates a laser welding method in accordance with another embodiment of the invention.

A more precise method for making a larger area of exposure is shown in FIG. 4 in which, as before, a first metal body 11 is in contact with the second metal body 12. The first metal body 11 is covered with a gold layer 13, the intermediate nickel layer not being shown for purposes of simplicity. The gold layer 13 is removed through the use of a Q-switched Nd:YAG laser 23, which is deflected by an optical deflector 24. The laser beam 25 produced by laser 23 scans the gold layer 13 to produce a well defined opening 26. Well defined openings can be made in layers two to twenty microns thick with an average laser power of four watts, a pulse repetition rate of six hundred hertz, a pulse width of one hundred nanoseconds, and an incremental line-to-line step of 0.025 millimeters. With a two micron thickness of gold layer 13, the linear scan rate may be thirty-three millimeters per second. With a gold layer thickness of nine microns, the rate may be nineteen millimeters per second, and for a thickness of 18.75 microns, the linear scan rate may be 10.5 millimeters per second. After the opening 26 has been made, the laser weld can be made with the laser 18 as shown in FIG. 3.

In addition to greater control of the opening, the FIG. 4 embodiment is also more effective than the FIG. 2 embodiment in removing thicker plating layers. A major disadvantage of the FIG. 4 embodiment, however, is that a different laser must normally be used for making the opening 26 than is used for making the weld of FIG. 3. A disadvantage of both embodiments is that laser ablation produces a certain amount of debris which may contaminate adjacent optical elements. However, where such contamination is not a problem, the invention is obviously advantageous over prior methods which manifest the microcracking problem, and alternative methods that would require chemical etching of the gold plating.

The various embodiments are intended to be merely illustrative of the inventive concept involved. Other protective metal layers such as silver may be removed by this process, and the process may be useful with bodies made of material other than Kovar. As mentioned before, Kovar is a preferred material because of its favorable thermal expansion characteristics. Other embodiments and modifications may be made by those skilled in the art without departing from the spirit and scope of the invention.

We claim:

1. A method for producing a weld in a first body of a first metal which has been plated on at least one surface thereof with a layer of a second metal comprising the steps of:
   vaporizing a portion of said layer comprising the step of directing a first pulsed laser beam at the layer, the first pulsed laser beam having a first peak power and a first pulse duration; said vaporizing resulting in exposure of a portion of said first body;
   and melting part of said first body comprising the step of directing a second pulsed laser beam at the exposed portion of said first body, said second pulsed laser beam having a second peak power that is smaller than said first peak power and a second pulse duration that is longer than said first pulse duration.

2. The method of claim 1 wherein:
   said melting step comprises the step of melting part of a second body in contact with said first body, thereby to weld the first body to the second body.

3. The method of claim 2 wherein:
   the first and second pulsed laser beams are both generated by a common laser.

4. The method of claim 3 wherein:
   the vaporization results from a single pulse of the first pulsed laser beam.

5. The method of claim 3 wherein:
   the vaporizing step comprises the step of vaporizing a first portion of said layer with a single pulse of the first pulsed laser beam, moving the first body with respect to the first pulsed laser beam, and vaporizing a second portion of said first layer, the second portion overlapping the first portion.

6. The method of claim 3 wherein:
   the vaporizing ablates a portion of said first layer.

7. The method of claim 2 wherein:
   the first and second pulsed laser beams are generated by different lasers.

8. The method of claim 7 wherein:
   a plurality of pulses of the first laser beam are used for vaporizing;
   and the first pulsed laser beam scans an area of the layer to vaporize said portion of the layer.

9. A fabrication method comprising the steps of:
   plating a first surface of a first body of a first metal with a coating of a second metal;
   bringing a second body of metal into contact with said first body;
   laser welding together the first and second bodies comprising the steps of: (a) directing at the coating of second metal at least one pulse of first laser light of sufficiently high intensity and short duration to vaporize a portion of said coating, thereby to expose a surface portion of said first body; (b) directing at said exposed surface portion at least one pulse of second laser light of sufficiently high intensity to melt part of said first body and part of said second body in contact with said first body, but of lower intensity than said first laser light and of longer duration than said first laser light; and (c) cooling to harden the melted portions of the first and second bodies, thereby to weld together said first and second bodies.

10. The method of claim 9 wherein:
    a plurality of pulses of the first laser light are used;
    and the first laser light scans an area of the coating to vaporize an area of the coating.

11. The method of claim 9 wherein:
    said first laser light is of sufficiently high intensity and short duration to ablate a portion of said coating;
    and said second light is of sufficiently low intensity to substantially avoid vaporizing and to substantially avoid ablating said first body.

* * * * *